Feb. 12, 1935.  E. A. SCHNUELLE ET AL  1,990,672
SURFACE CULTIVATOR SHOE
Filed July 13, 1934
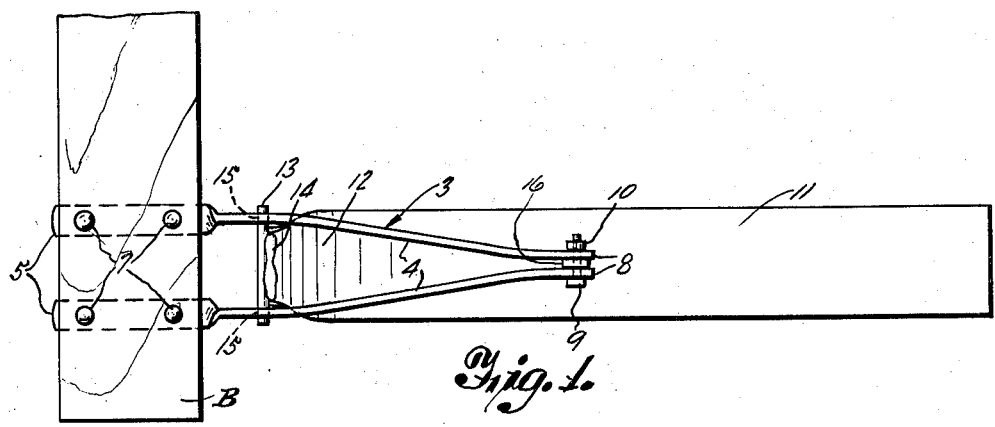
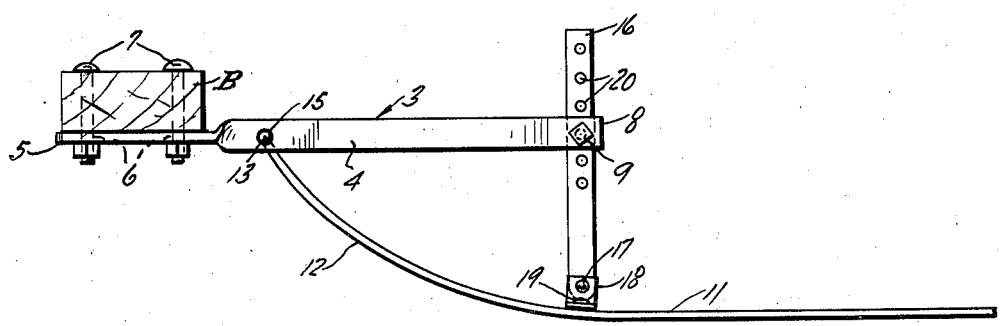
INVENTORS
EDWARD A. SCHNUELLE
CARL J. FERNQUIST
By Adam E. Fisher
ATTORNEY Patented Feb. 12, 1935

1,990,672

UNITED STATES PATENT OFFICE 1,990,672

SURFACE CULTIVATOR SHOE

Edward August Schnuelle and Carl J. Fernquist, Dix, Nebr.

Application July 13, 1934, Serial No. 734,887

1 Claim. (Cl. 97—190)

Our invention relates to improvements in surface cultivator shoes and the main object is to provide a simple and efficient form of adjustable shoe for surface cultivation and for pulverizing sod and clods.

Another object is to provide a shoe suitable for attachment to any form of cultivator or harrow and comprising a frame having shanks for bolting to the carrying implement and with rearwardly extended and converging ends, an elongated sled-like shoe pivoted at its forward upwardly turned ends between the shanks and extended rearwardly therefrom, an adjustment bar pivoted at its lower end to the shoe and extended upward between the rear ends of the shanks, the said bar having a series of apertures, and a bolt passed through the rear ends of the shanks and through any one of the apertures in the adjustment bar whereby the shoe may be adjusted vertically.

With these and other objects in view the invention resides in the novel construction and arrangement of parts as hereinafter fully set forth and claimed, reference being had to the accompanying drawing wherein:

Figure 1 is a plan view of the shoe as attached to a harrow beam only a fragment of which is shown.

Figure 2 is a side view.

Referring now with more particularity to the drawing the shoe includes a mounting frame designated generally at 3 and made up of a pair of shanks or bars 4 turned or twisted ninety degrees at their frontal ends to form flat mounting tangs 5 having bolt apertures 6 to receive bolts 7 by which they are bolted to the harrow beam B or to any other suitable part of the implement on which the shoe is mounted. The tangs 5 are mounted relatively far apart and shanks 4 extend rearwardly and converge whereby their rear ends 8 are disposed relatively close together as shown, these rear ends being provided with a through bolt 9 and nut 10. The shoe 11 is of elongated flat form and is turned upwardly at its frontal end 12 and tapered to enter between the shanks 4. A hanger pin 13 is welded at 14 across this upturned end of the shoe 11 and is pivotally mounted at its ends in aperture 15 in the shanks just rearwardly of the tangs 5. An adjustment bar 16 is pivoted by a rivet 17 to an L-shaped bracket 18 riveted at 19 to the shoe 11 and the bar extends upward between the rear ends 8 of the shanks. Said bar 16 has a series of spaced apertures 20 through any one of which the bolt 9 may be passed. It will thus be understood that by placing said bolt 9 through various ones of the apertures 20 the shoe 11 may be raised or lowered at its rear end as desired. This adjustment is of advantage in a number of ways and permits the elevation or lowering of the shoe according to the nature of the work. A plurality of shoes are, of course, used on each harrow or implement.

While we have herein set forth a certain preferred embodiment of my invention, it is understood that we may vary from the same in minor structural details, so as best to construct a practical device for the purpose intended, not departing from the spirit of the invention and within the scope of the appended claim.

We claim:

In a device of the kind described, a mounting frame comprising spaced shanks having mounting tangs at one end and apertures adjacent the said tangs, a through bolt through the other end of the shanks, a shoe having one end turned upward, a pin secured across this upturned end and pivoted at its ends in the said apertures in the shanks, and an adjustment bar pivoted on the shoe and extended up between the shanks and having a series of apertures to receive the said bolt.

EDWARD AUGUST SCHNUELLE.
CARL J. FERNQUIST.